(12) United States Patent
Wiseman

(10) Patent No.: US 10,313,454 B2
(45) Date of Patent: Jun. 4, 2019

(54) METHOD OF TRANSMITTING DATA STRUCTURES FROM ONE COMPUTER TO ANOTHER COMPUTER

(71) Applicant: DEEP-SECURE LIMITED, Malvern (GB)

(72) Inventor: Simon Robert Wiseman, Malvern (GB)

(73) Assignee: DEEP-SECURE LIMITED (GB)

( * ) Notice: Subject to any disclaimer, the term of this patent is extended or adjusted under 35 U.S.C. 154(b) by 29 days.

(21) Appl. No.: 14/913,669

(22) PCT Filed: Aug. 20, 2014

(86) PCT No.: PCT/GB2014/052556
§ 371 (c)(1),
(2) Date: Feb. 22, 2016

(87) PCT Pub. No.: WO2015/025162
PCT Pub. Date: Feb. 26, 2015

(65) Prior Publication Data
US 2016/0205170 A1 Jul. 14, 2016

(30) Foreign Application Priority Data

Aug. 22, 2013 (GB) .................................. 1315028.9

(51) Int. Cl.
*G06F 15/173* (2006.01)
*H04L 29/08* (2006.01)
*H04L 12/751* (2013.01)

(52) U.S. Cl.
CPC ............ *H04L 67/18* (2013.01); *H04L 67/025* (2013.01); *H04L 67/36* (2013.01); *H04L 45/02* (2013.01)

(58) Field of Classification Search
CPC ........ H04L 67/025; H04L 45/02; H04L 67/36
(Continued)

(56) References Cited

U.S. PATENT DOCUMENTS 5,933,822 A * 8/1999 Braden-Harder ..........................
G06F 17/30684
5,970,496 A 10/1999 Katzenberger
(Continued)

FOREIGN PATENT DOCUMENTS

| EP | 1244017 A1 * | 9/2002 | ....... G06F 17/30961 |
| EP | 1244017 A1 | 9/2002 | |
| EP | 1605646 A1 | 12/2005 | |

*Primary Examiner* — Anthony Mejia
(74) *Attorney, Agent, or Firm* — Leydig, Voit & Mayer, Ltd.

(57) ABSTRACT

A data structure is transmitted from a first computer to a second computer by transmitting a plurality of messages from the first computer to the second computer. Each message contains data of a node of the structure and one or more references to child pointer locations in previously transmitted nodes. The data of each transmitted node is stored in the second computer, and the location of each node is stored in a table of addresses and the or each reference includes an index into the table of addresses. The first computer may then use indexes into the table to identify which nodes need updating, and thus avoid the need for the first computer to know how the second computer is allocating nodes in memory. The or each reference may include an index into an array of child pointers belonging to a node, may include the sequence number of the parent node of the node being transmitted and may also include the index into the parent node's children to the pointer to the node being transmitted.

17 Claims, 14 Drawing Sheets

(58) Field of Classification Search
USPC .................................................. 709/224, 206
See application file for complete search history.

(56) References Cited

U.S. PATENT DOCUMENTS

| | | | | |
|---|---|---|---|---|
| 8,363,662 | B2* | 1/2013 | Thubert | H04L 41/12 370/400 |
| 8,620,962 | B1* | 12/2013 | Strunk | G06F 17/30094 707/797 |
| 9,600,565 | B2* | 3/2017 | Kusumura | G06F 17/30622 |
| 2001/0042186 | A1 | 11/2001 | Livonen | |
| 2006/0123029 | A1 | 6/2006 | LeTourneau | |
| 2006/0291404 | A1* | 12/2006 | Thubert | H04L 45/02 370/254 |
| 2007/0091811 | A1* | 4/2007 | Thubert | H04L 43/022 370/238 |
| 2007/0208693 | A1 | 9/2007 | Chang et al. | |
| 2009/0037456 | A1 | 2/2009 | Kirshenbaum et al. | |
| 2010/0003967 | A1* | 1/2010 | Datta | H04W 4/00 455/412.1 |
| 2010/0060643 | A1* | 3/2010 | Kolipaka | G06T 11/206 345/440 |
| 2010/0114969 | A1 | 5/2010 | LeTourneau | |
| 2011/0161326 | A1* | 6/2011 | Rizzo | G06F 17/30011 707/741 |
| 2012/0155276 | A1* | 6/2012 | Vasseur | H04L 45/04 370/237 |
| 2013/0218896 | A1* | 8/2013 | Palay | G06F 17/30312 707/741 |
| 2014/0359029 | A1* | 12/2014 | Jagadish | G06F 17/30619 709/206 |
| 2017/0139902 | A1* | 5/2017 | Byron | G06Q 10/087 |

\* cited by examiner

Figure 2
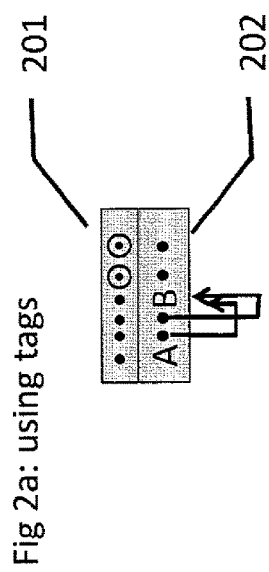
Fig 2a: using tags
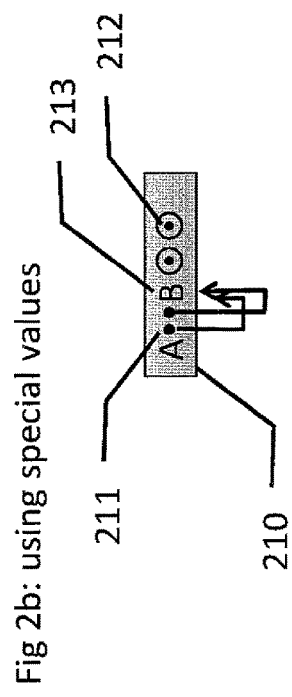
Fig 2b: using special values

Figure 8: Two-level Node Queue

Fig 8a: One frame

Fig 8b: Two frames

METHOD OF TRANSMITTING DATA STRUCTURES FROM ONE COMPUTER TO ANOTHER COMPUTER

FIELD OF THE INVENTION

The present invention relates to the transmission of graph data structures from one computer to another across a communications network. The invention relates particularly, but not exclusively, to the transmission of acyclic graph data structures.

BACKGROUND

Acyclic graphs can be transmitted from one computer to another in a top-down fashion. This has the advantage that the receiving computer's application can commence processing the graph before it has been completely received.

The receiving computer will create nodes before the nodes they reference have been created, so when a node is created it is necessary to update the nodes that reference it. The transmitting computer therefore needs to instruct the receiving computer as to the location of the nodes that need updating by providing a reference to them. This puts limitations on how the memory of the receiving computer can be used, which in turn restricts how an application can run on the receiving computer, until the data structure is complete.

It is an object of embodiments of the invention to provide a method of transferring a data structure between computers which allows efficient use of computer memory resources and, in particular, allows an application running on a receiving computer to use memory resources while processing a data structure which is being received, without needing memory allocation strategies that result in poor utilisation.

SUMMARY OF THE INVENTION

According to the present invention there is provided a method of transmitting a data structure from a first computer to a second computer comprising the steps of: transmitting a plurality of messages from the first computer to the second computer, each message containing data of a node of the structure and one or more references to child pointer locations in previously transmitted nodes; storing the data of each transmitted node in the second computer; and storing the location of each node in a table of addresses wherein the or each reference comprises an index into the table of addresses.

By creating a lookup table to record the location of nodes that have been created in the second computer, the first computer may then use indexes into this table to identify which nodes need updating, and thus avoid the need for the first computer to know how the second computer is allocating nodes in memory.

The or each reference may further comprise an index into an array of child pointers belonging to a node. The reference may comprise the sequence number of the parent node of the node being transmitted. The reference may also comprise the index into the parent node's children to the pointer to the node being transmitted.

The receiving computer may maintain a queue of node addresses containing the address of each node which has yet to be completed. The queue may comprise a list of addresses along with a sequence number of the node which is first in the queue.

A reference may be converted into an address by calculating an address in the queue from a sequence number comprised in the reference. The node's start address and size of the nodes data may then be combined to determine the address of the first child pointer, and an index into the parent node's children added to yield the address of the referenced child pointer.

The table may be created by and stored by the second computer.

Locations of nodes stored in the table may be removed when the node has been completed in the second computer, enabling the memory location in which the node location was stored to be reused.

The table may be represented as a list of table frames referenced by a table of pointers. Addresses to incomplete nodes may be removed from the table frames as the nodes are completed and table frames are reused once they become empty.

As only nodes that need updating are stored in the lookup table, this reduces the memory size needed. Since nodes are updated in the same order they are created a queue can be used to implement the lookup table.

The data structure may be acyclic.

An application running on the second computer may begin processing the data structure before it has been entirely received by the second computer. Processing the data structure may be suspended when the application seeks to process an incomplete part of the data structure, and resumed when that part of the data structure has been completed. This could be achieved by the application setting a variable when it seeks to process an incomplete part of the data structure. When a node or nodes is/are created and pointers updated in order to complete the relevant part of the data structure, the referenced location may be checked against the variable in order to determine if the application may continue.

The second computer may construct nodes in its memory in response to the messages received in such a way that child pointer references that have not been populated can be distinguished from the remainder of the node. This enables the second computer to validate the references contained in the messages by checking if the location they reference is a child pointer that has not been populated. A tag bit associated with each data location may be used to distinguish between a location that contains a child pointer that has yet to be populated and a location that contains a data value or populated child pointer. Alternatively, or additionally a child pointer that has yet to be populated may be distinguished from a location that contains a data value or populated child pointer by containing a special value that is never used as a data value or populated child pointer. Or the pointer may be assigned a NULL value.

BRIEF DESCRIPTION OF THE DRAWINGS

In order that the invention may be more clearly understood embodiments of the invention will now be described, by way of example only, with reference to the accompanying drawings, of which:

FIG. 2 shows how pointer locations that need to be updated can be validated;

DETAILED DESCRIPTION OF THE INVENTION

Figure 1:
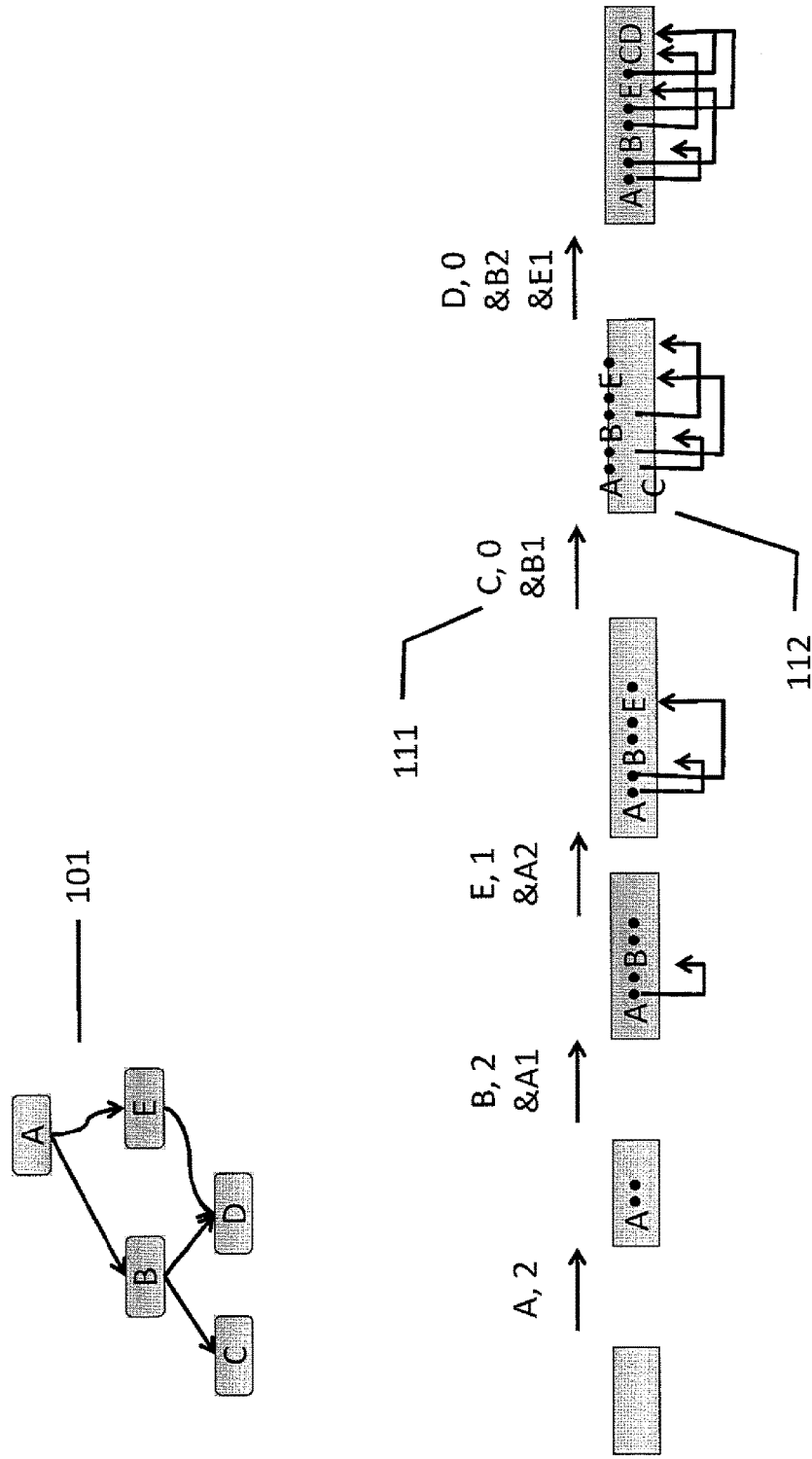
FIG. 1 shows an acyclic graph, and how the graph can be transmitted in a top-down fashion.

An acyclic graph can be transmitted in a top-down fashion by sending a node before its child nodes. A node is sent as a message containing the node's data and a count of the number of child nodes. FIG. 1 show how graph 101 can be transmitted in a top-down fashion as a series of messages 111. Received nodes are constructed in a node store 112. When a node is constructed its child pointers are set to the NULL pointer value. The message that constructs a node contains references to all the pointers in previously received nodes that must be populated with a pointer to the new node.

If the references to pointer locations given in a message are invalid, the receiver will construct an invalid graph. This may lead to serious errors in the application processing the graph and so must be avoided.

To enable references to be validated memory locations containing NULL pointers can be distinguished from locations containing populated pointers or data values.

In the embodiment illustrated in FIG. 2*a* the memory locations of the node store 202 are tagged with tag bits 201. These can be set in order to indicate that the memory location has a NULL value.

Alternatively, in the embodiment illustrated in FIG. 2*b* NULL pointers are set to a special value 212 that is never used as a pointer 211 or data value 213.

Thus, if a reference to a pointer location refers to a location which does not have an associated tag set to indicate that the location has a NULL value, or is not set to a special value, the receiving computer knows that the location is an invalid one, and the message can be rejected. This enables at least some invalid messages to be rejected.

Figure 3:
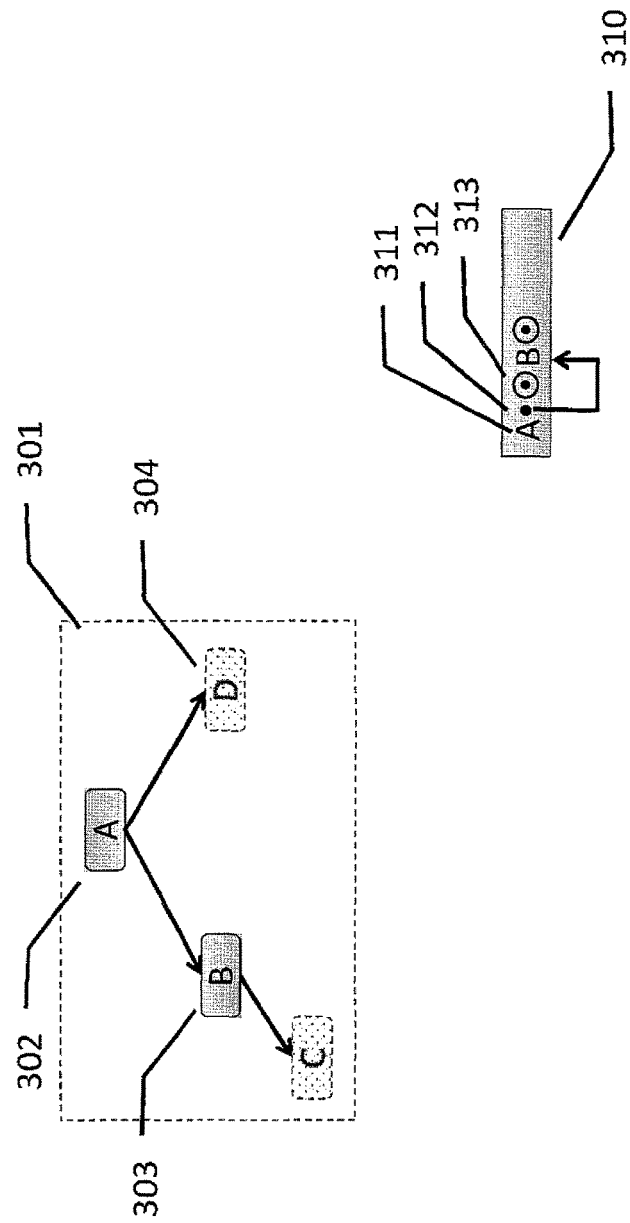
FIG. 3 shows how an application can process a graph in parallel with it being constructed.

An advantage of a receiving computer constructing a graph in a top-down fashion is that the application on the receiving computer may start processing the graph before it has been received in its entirety. FIG. 3 shows a graph 301 that has been partially received, with nodes 302 and 303 received and node 304 yet to be received.

At this point the node store contains a representation 311 of node 302 including a pointer 312 to its child 303 that has been received and a NULL pointer 313 that will be set to point to its child 304 once that has been received.

If while processing received node 302, stored as 311, the application needs to follow the pointer to node 303 it may do so as the pointer is populated 312. However if it needs to follow the pointer to node 304 it must wait because the pointer has yet to be populated 313. Once the receiver has received and built node 304 pointer 313 will be populated so that it refers to the stored node and the application may proceed with processing.

Figure 4:
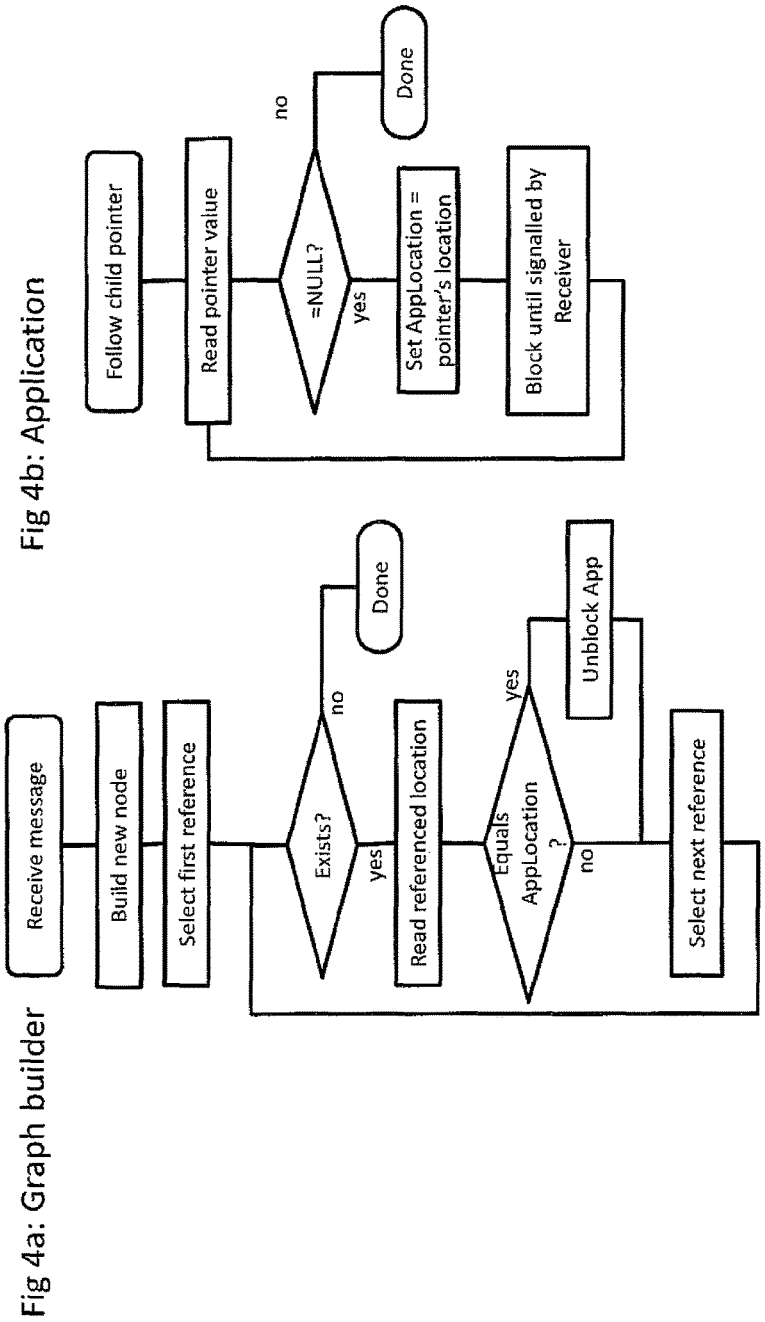
FIG. 4 shows a method by which an application can synchronise with the construction of the graph.

FIG. 4 illustrates the method by which the receiving computer's graph builder and tree processing application cooperate to allow the application to proceed with its processing in parallel with the graph being built. A variable shared by the two processes, referred to as AppLocation in the flow charts, is used to synchronise the two processes when this is necessary. The variable is set by the application when it finds it needs to follow a NULL pointer. Having set the variable the application waits for a signal from the tree builder process. When the graph builder creates a node it fills in all the required pointers to that node to complete the graph. Once a pointer is updated, the builder checks the referenced location against the AppLocation variable and if equal it signals the application to indicate that the pointer has now been populated and can be read to continue processing.

The messages sent by the sending computer include references to child pointer locations in previously sent nodes. These references could be the address of the pointer location in the receiving computer's memory. This would require the sending computer to understand and track how the receiving computer allocates its memory. This is possible if the memory is only used to create the received graph, though it is undesirable as it means the implementation of the sender is tied to the implementation of the receiver. However, giving the receiving computer's graph builder exclusive use of a memory is a serious limitation that either precludes the application from using memory while the graph is being built or requires pre-allocation of memory resources which results in poor memory utilisation. An alternative is to use the node index number in the references, but the receiving computer would then need to search the node store in order to locate the node and this reduces performance and makes it unpredictable.

Figure 5:
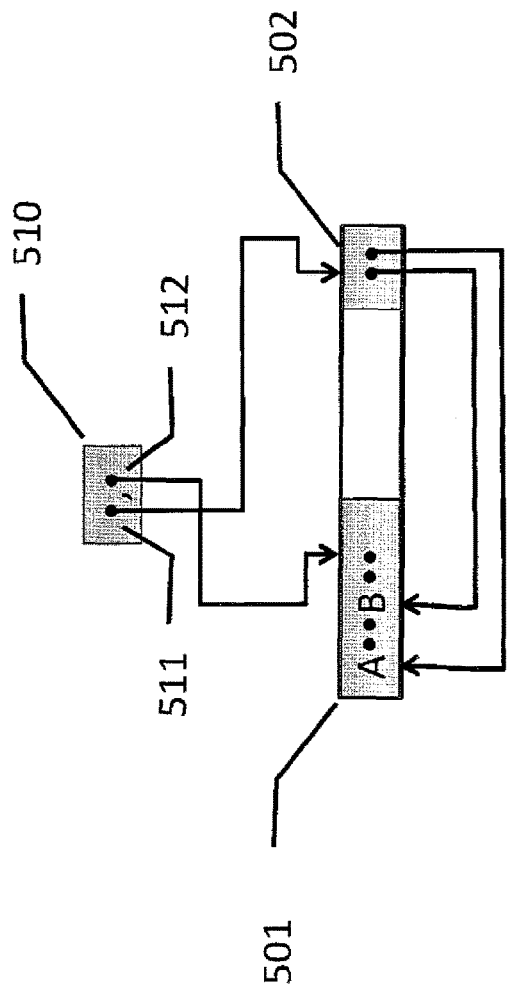
FIG. 5 shows how pointer locations can be referenced without the transmitting computer having knowledge of how the receiving computer allocates nodes in memory.

FIG. 5 shows how references can be implemented as indexes without searching by using a table of node pointers that is built up by the receiving computer as nodes are created. The node store 501 contains nodes that have been built so far and this grows upwards from the start of memory. The node address table 502 contains pointers to the nodes built so far and this grows downwards from the end of memory, thus providing optimum memory utilisation. A reference 510 comprises two indexes. The first index 511 indexes the node address table to find the start address of the referenced node. The second index 512 is an index within this node's list of child node pointers to the referenced pointer location.

The receiving computer maintains a table of pointers to nodes that have been allocated and the address of the node containing a referenced pointer is obtained by using the reference's node index to select the entry from this table. The node's table of children is then indexed by the reference's child index to select the referenced pointer. In the example illustrated in FIG. 5, the reference 510 is a reference to second child of node B. 511 is the index of node B (=2) and 512 is index of the second child (=2) of node B.

Use of the node address table described above allows the application to use the node store as a heap store, allocating blocks of memory as it requires, since the transmitting computer need not be aware of the actual location of the stored nodes. However applications typically require a stack in addition to a heap store and since the node address table uses the other end of memory there is nowhere to place the application stack without pre-allocating large amounts of store that results in poor memory utilisation.

Studying the way in which the node address store is utilised, it becomes apparent that it is not necessary to keep the addresses of all nodes in it. Only those nodes having some child pointers to nodes that have yet to be created need to be stored. Further, with the transmitting computer sending nodes in a top-down fashion, nodes are completed in a top-down fashion so the node address table operates like a queue. If new nodes are added to one end of the queue nodes are completed in the order they are queued and so nodes can be removed from the other end of the queue once they are completed. As a result, far less memory is needed for the node address table than is at first apparent.

Figure 6:
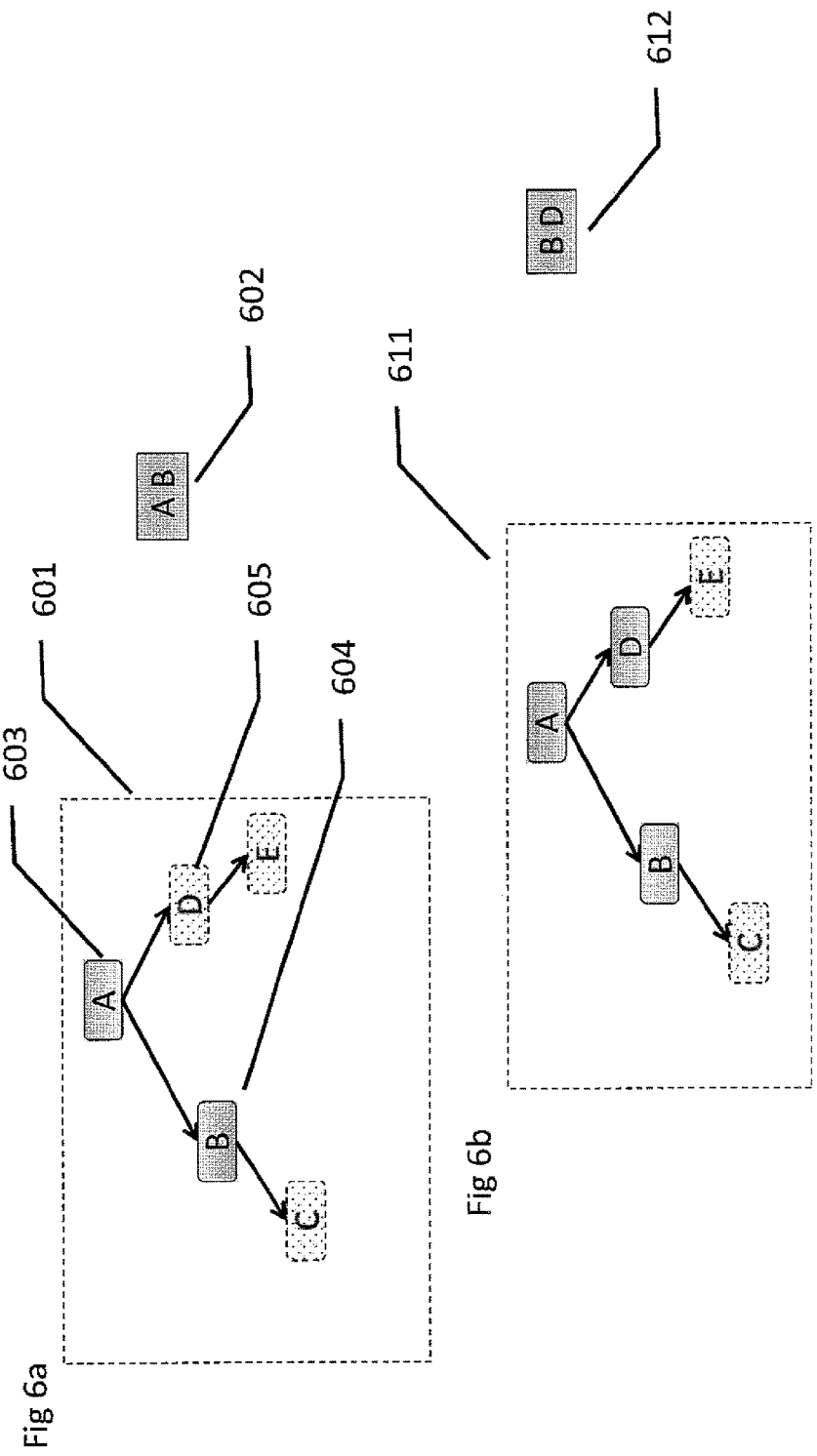
FIG. 6 shows that a stack can be used to track incomplete nodes.

This is demonstrated in FIG. 6. FIG. 6*a* shows a partially complete tree 601 received along with the node address table 602. The node address table 602 only contains the addresses of the incomplete nodes 603 and 604 of the partially complete tree. Once the next node sent 605 is received and built, the partially complete tree 611, shown in FIG. 6*b*, has corresponding node address table 612. This now contains the address of the newly received incomplete node 605 but no longer contains the address of node 603 as this is now complete.

Figure 7:
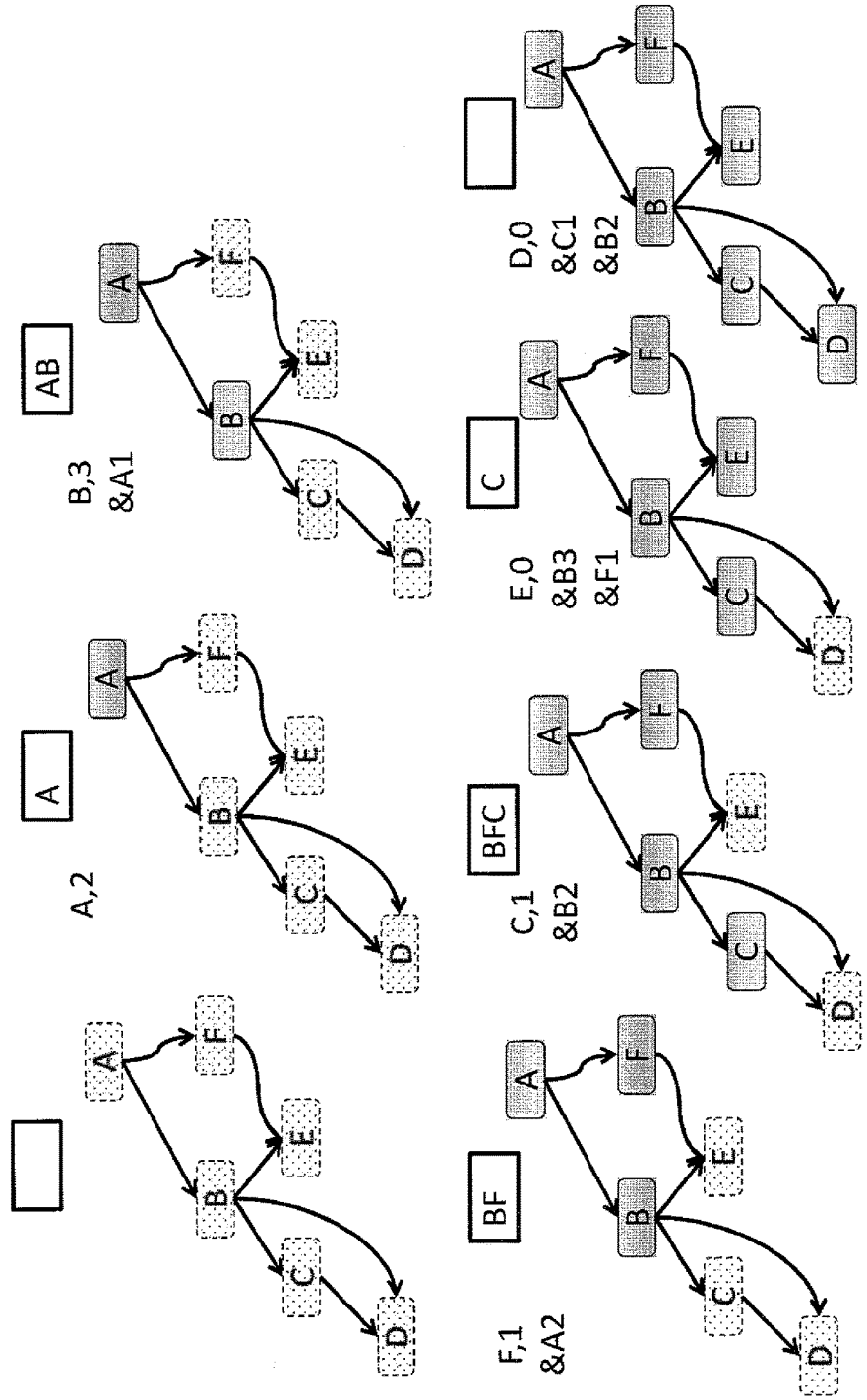
FIG. 7 shows a larger example of how a stack can be used to track incomplete nodes.

A larger example is shown in FIG. 7. This shows various stages in the construction of a graph structure by a receiving computer, with the node queue of incomplete nodes shown in a box above each graph. Again, the address table only need contain the addresses of those nodes in the queue, and which are partially built.

The transmitting computer can readily keep track of the number of incomplete references in the receiving computer, so it can use an index into the node queue in its references.

Removing entries from the node address table as nodes are completed means less memory is required, but a straightforward implementation would copy remaining node addresses down to the end of the memory to recover the space. This copying takes time, which reduces performance and makes it unpredictable.

Copying can be avoided by implementing the queue as a list with each address assigned to a separate list entry and each list entry containing the address of the next entry. However with this method performance is affected by the need to search the list to find a particular entry.

If an application running on the receiving computer is to process the tree in parallel with it being built, it too will require some memory. The application could use the same node store as heap storage, but there is no room for a stack since the receiver is using both ends of the memory, so enough stack space must be allocated to handle the worst case, which leads to poor memory utilisation.

The node queue could be allocated in the node store, leaving the other end of memory for the application to use as a stack, but it would have to be a fixed size. This limits the width of the tree that can be transmitted. A list of node queue frames could be allocated, but then a search would be required to locate an entry in the table.

Figure 8:
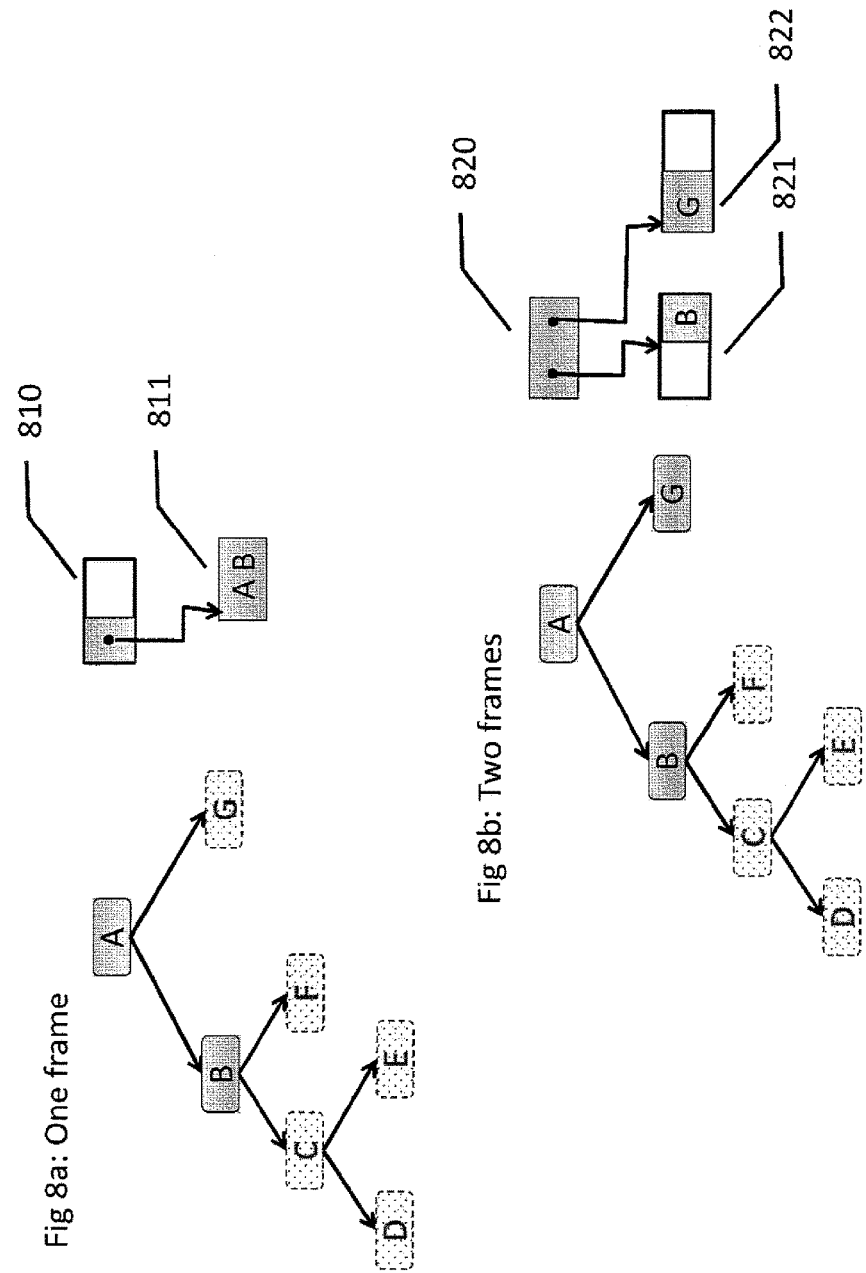
FIG. 8 shows how a two-level table can hold the stack of incomplete nodes efficiently.

An approach that does not unduly affect performance is to create a two level structure in which the queue is divided into a list of blocks of addresses, with a top-level table containing the addresses of each block in the list. This is shown in FIG. 8. The blocks are of a fixed size. So the index of an entry is readily converted into an index into the top-level table and an index into the block referenced from the top-level table, by dividing by the size of the frames to yield an index into the top level table so the remainder after division yields an index into the selected frame.

The maximum number of incomplete nodes that can be stored is now the size of the top level table multiplied by the size of the frames. This is effectively a constraint on the width of the trees that can be transmitted. Larger table sizes mean less restriction but reduced memory utilisation. However in practice the sizes can be chosen to impose little constraint without much reduction in memory utilisation. For example, if the top level table can contain 1000 entries and the table frames can contain 1000 node pointers, the width of the tree is restricted to 1,000,000 nodes which is commensurate with the size of memory likely to be available to store the tree and hence is effectively no constraint.

Once all the nodes have been removed from a frame it can be reused when another frame is needed.

In the example illustrated in FIG. 8, in FIG. 8*a* the top level table 810 contains a single pointer to a table frame 811 containing pointers to incomplete nodes A and B. After receipt of node G, the situation is as illustrated in FIG. 8*b*. The top level table 820 now contains pointers to two table frames, a first table frame 821 containing pointers to node B and a second table frame 822 containing pointers to node G.

As entries are added to the queue the last block is filled. Once filled a new block is allocated at the end. As entries are removed from the queue the first block is emptied. Once completely empty the first block is deleted and its storage can be reused.

FIGS. 9 to 14 illustrate a further embodiment of the invention employing a top down technique for transmitting data from a first transmitting computer to a second receiving computer. The method is implemented by appropriate software running on the respective computers.

Figure 9:
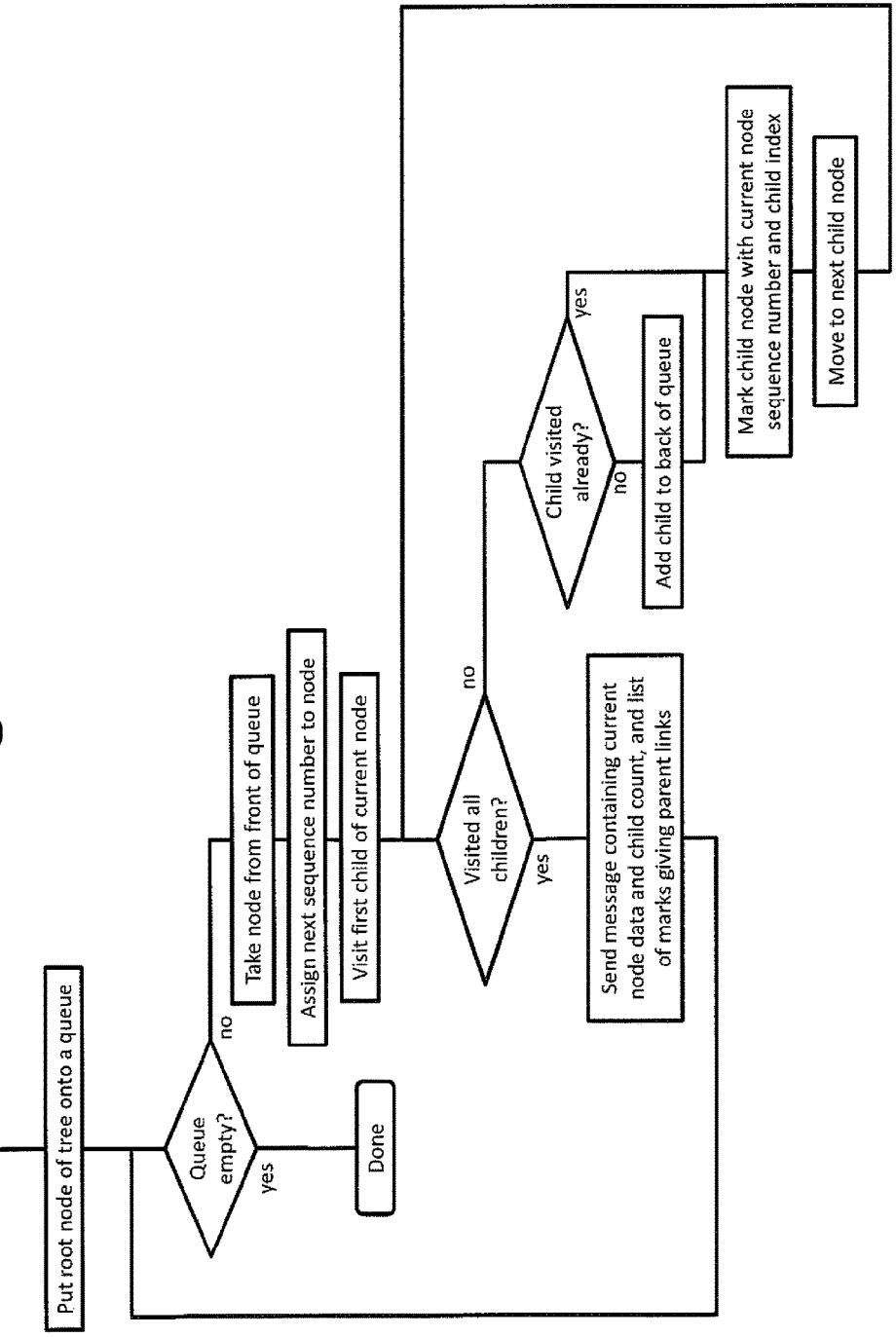
FIG. 9 shows processes performed by a transmitting computer implementing a method according to an embodiment of the invention.

FIG. 9 illustrates the steps performed by the transmitting computer to transmit data in a top down fashion.

The process runs along similar lines to that illustrated in FIG. 1.

The transmitter uses a queue to keep track of which nodes need to be sent. It also marks nodes with a sequence number and a list of parent nodes that reference them along with an indication of which child of that parent node they are.

The transmitter starts by putting the root node onto the queue.

While the queue is not empty, the transmitter takes the first node off the queue and processes it. For each node processed, the transmitter assigns it a sequence number and then visits each child node in turn. If the child has not been visited it is added to the queue. Then the child is marked with the current node's sequence number and current child index value. The transmitter can determine if a node has been visited before because those that have yet to be visited have no sequence number assigned.

Once all the children of a node have been visited, a message is sent describing the node. The message contains the node's data and the number of children it has, allowing the receiver to construct the node in memory. The message also contains the list of marks that have been added to the node. These tell the receiver which nodes need updating to refer to the new node.

Figure 10:
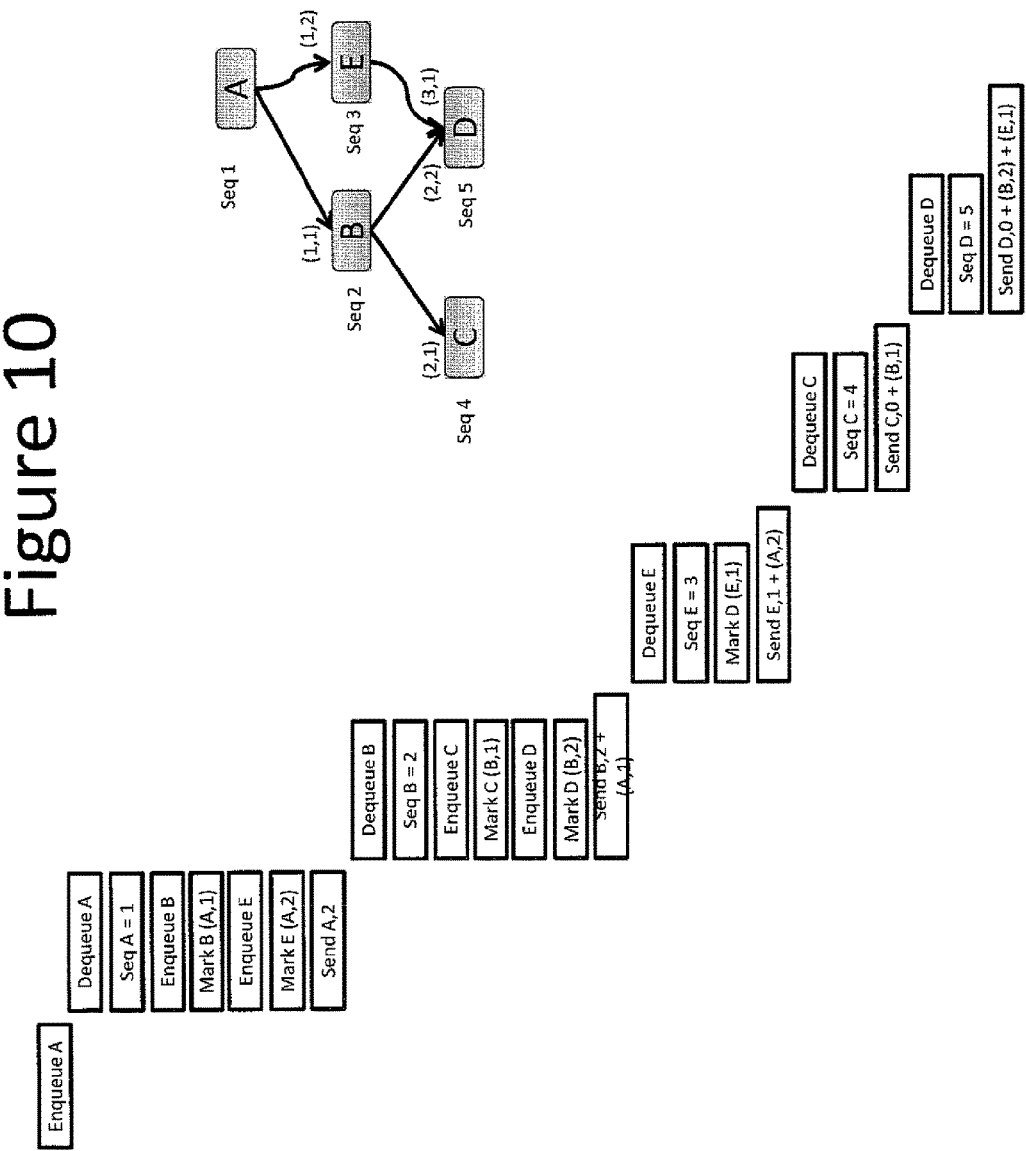
FIG. 10 shows an example of data transmitted by a computer performing the processes of FIG. 9.
Figure 11:
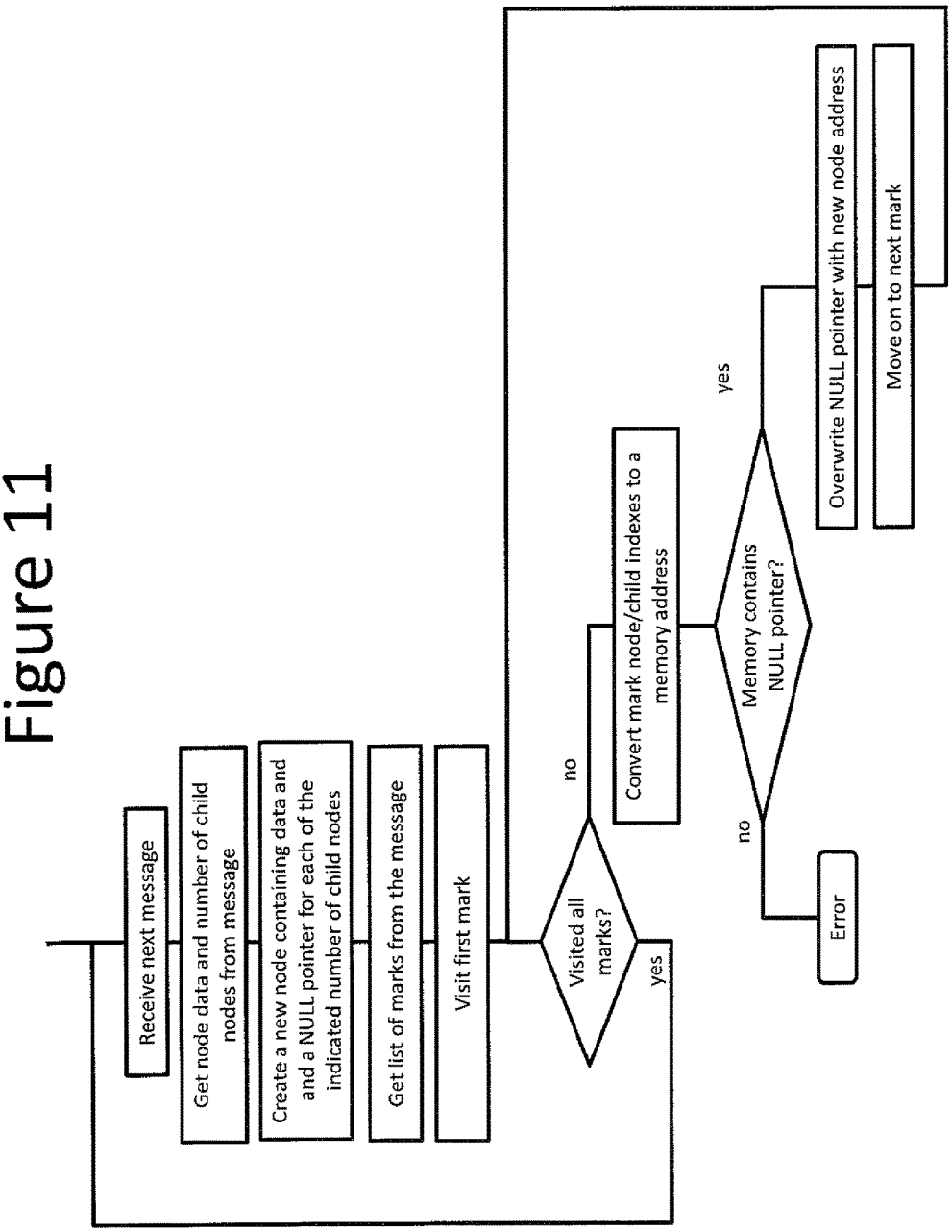
FIG. 11 shows processes performed by a receiving computer implementing a method according to the embodiment of the invention shown in FIGS. 9 and 10.

FIG. 10 shows an example transmission of the tree illustrated in the figure using the process shown in FIG. 9. The tree is shown annotated with the sequence numbers that are assigned to the nodes and the marks that are associated with them. The marks are a pair of numbers, the first being the sequence number of the parent node and the second the index into that node's children to the pointer to the marked node. Note that node D has two parents, it is a shared common sub-tree of B and E, so has two marks. The root node A has no parents and so has no marks. The transmission involves the following steps:

1. The root node A is queued
2. A is removed from the queue and given the sequence number 1
3. The children of A are visited in turn, B is queued and marked that it is the first child of node A
4. E is queued and marked that it is the second child of A
5. Node A's data is sent, along with an indication it has two children
6. The next node in the queue, B, is taken and given the sequence number 2
7. The children of B are visited in turn, C is queued and marked as the first child of B
8. D is queued and marked as the second child of B
9. Node B's data is sent, along with an indication it has two children and that it is the first child of A
10. The next node in the queue, E, is taken and given the sequence number of 3
11. The children of E are visited in turn. D has already been visited so is not added to the queue again, but it is marked as being the first child of E in addition to the second child of B.
12. Node E's data is sent, along with an indication it has one child and that it is the second child of A
13. The next node in the queue, C, is taken and given the sequence number 4.
14. The children of C are visited in turn, but there are none. So node C's data is sent, along with an indication it has no children and that it is the first child of B
15. The next node in the queue, D, is taken and given the sequence number 5.
16. The children of D are visited in turn, but there are none. So node D's data is sent, along with an indication it has no children and that it is the second child of B and the first child of E The queue is now empty so the transmission is complete FIG. 11 shows the steps performed by the receiving computer when receiving data transmitted by the transmitting computer in order to create a copy of the tree being transmitted by the transmitting computer.

The receiver constructs nodes in consecutive memory locations. It receives a message containing a node's data and writes this into the next free location in memory. It then obtains the number of child nodes from the message and appends a NULL pointer to the node data for each one.

Next, the receiver visits each of the marks in the message. Each mark refers to one of the child pointers of a previously created node. The mark information is converted to the memory address of the child pointer using a technique described below.

The receiver then checks if the addressed location contains a NULL pointer. If it does not then the mark is invalid, as NULL pointers only appear in the location of a child pointer that has not yet been set. If the addressed location does contain a NULL then the address of the newly constructed node is written to this location. The receiver then moves on to the next mark. Thus, by having allocated null pointers to un-set child pointers the receiving computer is able to detect certain errors in data transmission, in particular is guards against the pointer being updated more than once.

Figure 12:
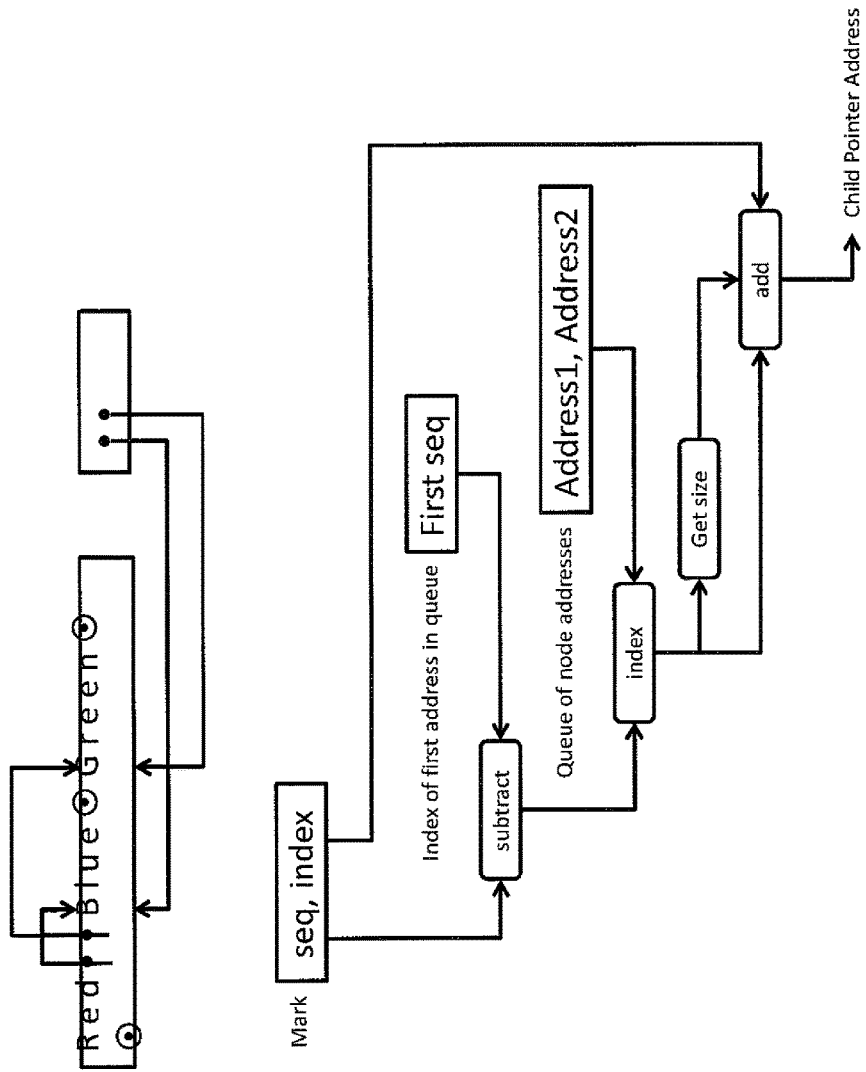
FIG. 12 shows further processes performed by a receiving computer implementing a method according to the embodiment of the invention of FIGS. 9 to 11.

FIG. 12 shows how the receiving computer is able to convert the marks to a memory address, without any searching and without using large amount of memory.

The receiver maintains a queue of node addresses containing the address of each node that is yet to be completely written. The nodes are stored in the queue in the order in which they will be transmitted, which is the same order in which they will be completed.

Logically, the queue is a list of node addresses along with the sequence number of the node that is first in the queue. A mark is converted to an address by first taking the node sequence number from the mark and calculating which address in the queue is that of the referenced node by subtracting the first-in-queue sequence number from the mark sequence number to produce an offset into the queue to the referenced node's address. Next the node's data is examined to determine its length. As the first child pointer follows the node's data, adding the node's start address and size of the node's data together give the address of the first child pointer. The mark's child index is added to this address to yield the address of the referenced child pointer.

The top portion of the figure first figure shows three nodes, the root node is Red and this has two children: Blue and Green. Blue has one child that is yet to be received and Green has two children that are yet to be received. The queue contains the addresses of the two incomplete nodes. When the next node is received this is placed after the Green node and the marks indicate which of the NULL pointers in the Blue and Green nodes need to be updated to refer to the new node.

The lower portion of the figure shows how the mark is converted to the address of the child pointer.

The sequence number of the node whose address is first in the queue is subtracted from the mark's node sequence number to produce an index into the queue to the address of the node referenced by the mark. The memory at this address is read to determine the size of the referenced nodes' data. This size is added to the node's start address and the child pointer index from the mark to produce the address of the child pointer that is referenced by the mark.

To enable efficient memory usage, the queue is implemented by a top level and second level tables. These are shown in FIG. 13.

The top level table contains a sequence of addresses that refer to second level tables. It has a fixed length that cannot be changed if it becomes full. The sequence may start anywhere in the table and if necessary wraps around to the beginning of the table. This is implemented by noting the location of the first address in the sequence.

The second level tables contain sequences of addresses of nodes. This sequence does not wrap round but need not start at the beginning of the table and need not fill the table.

Figure 13:
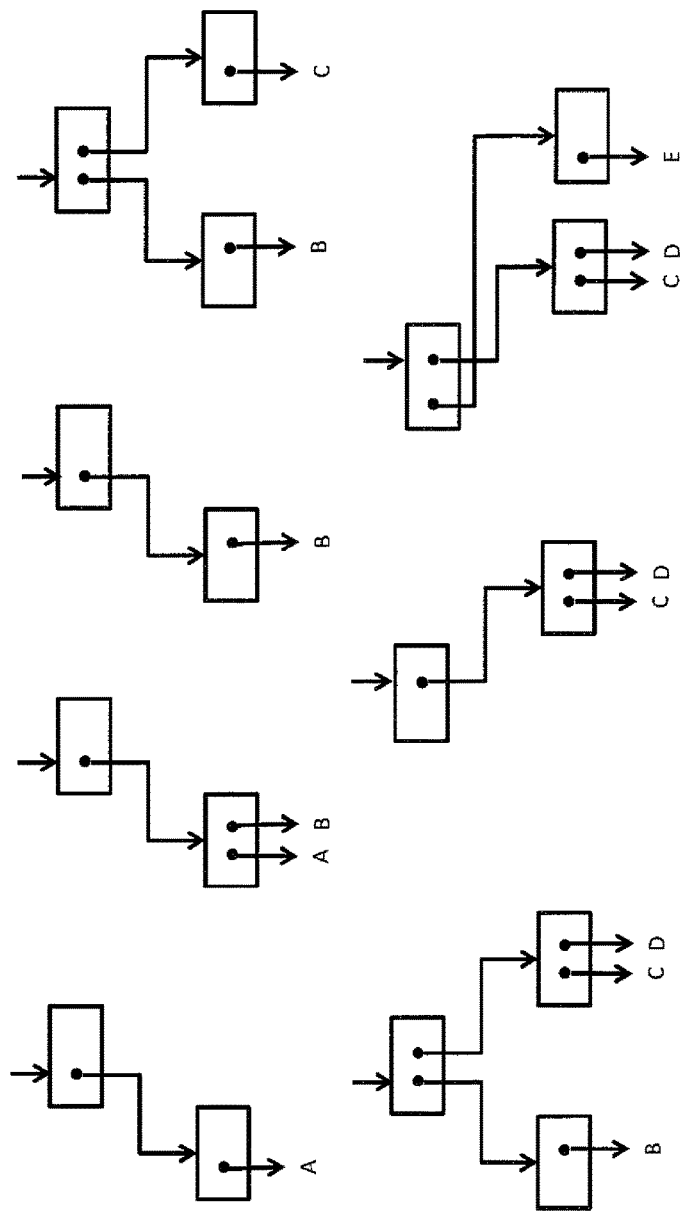
FIG. 13 shows shows an example of the use of top level and second level tables by a receiving computer implementing a method according to the embodiment of the invention of FIGS. 9 to 12.

Working from the top left in FIG. 13, the first diagram shows the queue having one item in it, A. There is one second level table. The top level table contains a pointer to the second level table at the beginning. The second level table contains the pointer to A also at its start.

The second diagram shows the state after item B is added to the queue. The pointer to B is stored in the next free place in the last second level table.

The third diagram shows the state after the first pointer, to A, is removed from the front of the queue. This is implemented by incrementing the "first address" offset associated with the second level block so no memory copying is involved.

The fourth diagram shows a pointer to C added to the queue. The second level block is full so a new second level block created to accommodate the new pointer. The address of this is added to the top level block.

Moving now to the second row of diagrams in the figure and starting at the left hand side the fifth diagram shows a pointer to D is added where there is room for this is the last second level block so it is added there.

As shown in the sixth diagram, when the pointer to B is removed from the queue, the first of the second level blocks becomes empty. So this block is discarded and the pointer to it is removed from the top level block by incrementing the "first address". If this reaches the end of the top level block it wraps round to the start of the block.

In the seventh diagram, when a pointer to E is added to the queue there is no room in the last second level block, so a new second level block is allocated. But when the pointer to the new second level block is added to the top level there is no room for it to go on the end so it wraps around and is placed at the beginning.

Figure 14:
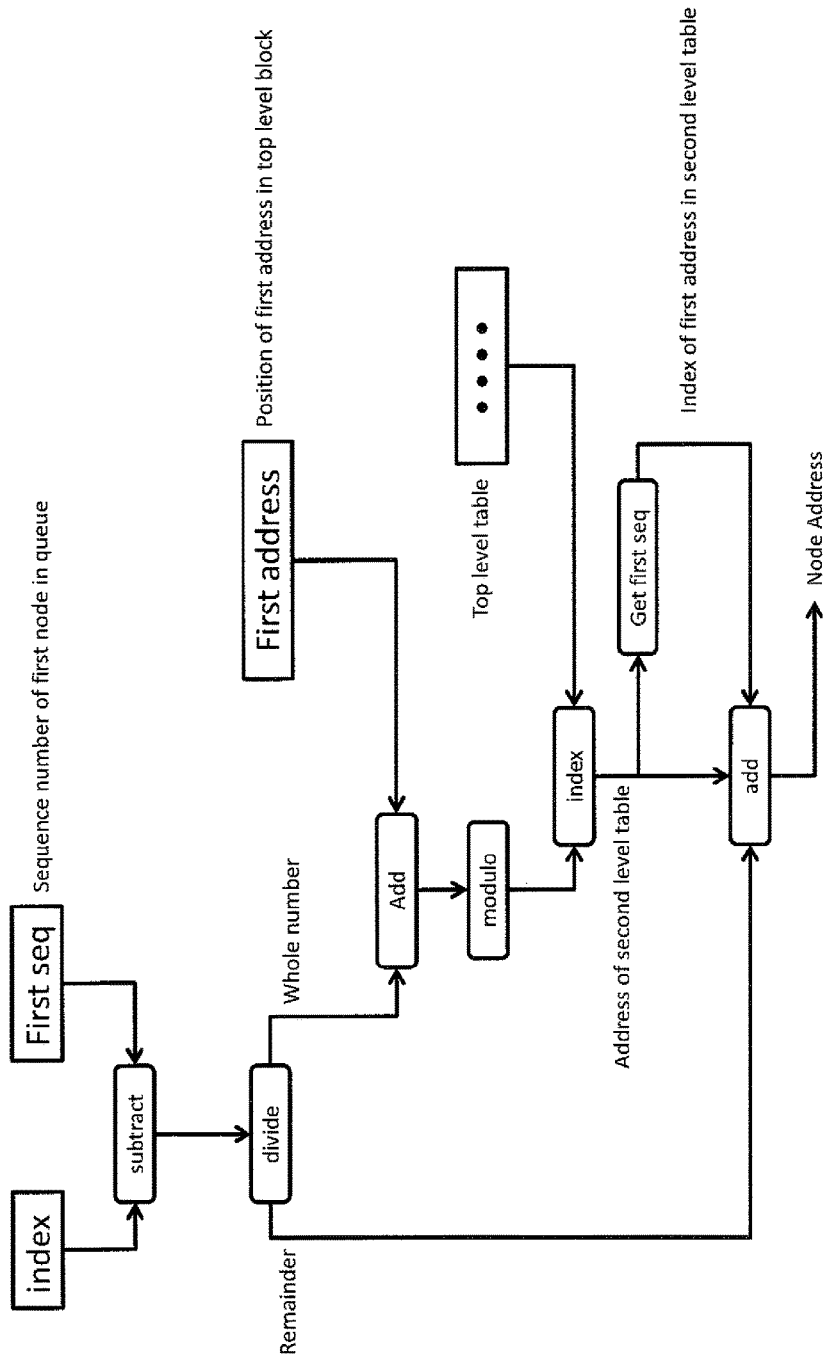
FIG. 14 further processes performed by a receiving computer implementing a method according to the embodiment of the invention of FIGS. 9 to 13.

FIG. 14 shows the logic used to map an index into the sequence of nodes to a node address.

The sequence number of the first node in the queue is subtracted from the index to give a relative index. This relative index is divided by the size of the second level tables to produce a whole number and remainder. The whole number is a index into the sequence of second level tables and the remainder is an offset within the selected table. The remainder is the offset within the second level block to the node's address.

The whole number is added to the index of the first address in the top level table to give an offset into the top level table, but this is value is then wrapped around by using a module function which takes the remainder of the value when divided by the length of the top level table. This gives an offset into the first level table to the location of the relevant second level table. The top level table is indexed with this value to produce the address of the second level table.

Next the second level table is accessed to get the index to the first address within it. This value is added to the address of the second level table and the remainder to produce the node address.

The above embodiments are described by way of example only. Many variations are possible without departing from the invention. as defined by the appended claims.

The invention claimed is:

1. A method of building an acyclic graph data structure sent from a first computer to a second computer comprising the steps of:
   receiving, by the second computer, a plurality of messages sent from the first computer to the second computer, each message containing data of a node of the acyclic graph data structure and one or more references to child pointer locations in any previously transmitted parent nodes to said node;
   building the acyclic graph data structure on the second computer, wherein building includes:
      storing the data of each transmitted node in a memory of the second computer;
      storing the location of an address at which each node is stored in the memory of the second computer in a table of addresses; and
      storing a child pointer to each node stored in the second computer at the or each child pointer location referenced in the message, wherein the or each reference to a child pointer location comprises an index into the table of addresses; and
   processing, by an application running on the second computer, the acyclic graph data structure during the building of the acyclic graph data structure on the second computer.

2. A method as claimed in claim 1 wherein the or each reference to a child pointer location further comprises an index into an array of child pointers belonging to a node.

3. A method as claimed in claim 1 wherein the address of a node stored in the table is removed when the node has been completed in the second computer.

4. A method as claimed in claim 1 wherein the table of addresses is represented as a list of table frames referenced by a table of pointers.

5. A method as claimed in claim 4 wherein the address of a node stored in the table frames is removed from the table frames when pointers to child nodes have been stored at all child pointer locations and table frames are reused once they become empty.

6. A method as claimed in claim 1 wherein the application running on the second computer begins processing the acyclic graph data structure before the acyclic graph data structure has been entirely received by the second computer.

7. A method as claimed in claim 6 wherein the processing of the acyclic graph data structure is suspended when the application seeks to process an incomplete part of the data structure, and resumes when that part of the acyclic graph data structure has been completed.

8. A method as claimed in claim 7 wherein a variable is set by the application when the application seeks to process an incomplete part of the acyclic graph data structure, and when nodes are created and pointers updated the referenced location is checked against the variable in order to determine if the application may continue.

9. A method as claimed in claim 1, wherein the second computer constructs nodes in its memory in response to the messages received in such a way that child pointer references that have not been populated can be distinguished from the remainder of the node.

10. A method as claimed in claim 9 wherein the second computer validates the references to child pointer locations contained in the messages by checking if the location they reference is a child pointer that has not been populated.

11. A method as claimed in claim 9 wherein a tag bit associated with each data location is used to distinguish between a location that contains a child pointer that has yet to be populated and a location that contains a data value or populated child pointer.

12. A method as claimed in claim 9 wherein a child pointer that has yet to be populated is distinguished from a location that contains a data value or populated child pointer by containing a special value that is never used as a data value or populated child pointer.

13. A method as claimed in claim 9 wherein a child pointer that has yet to be populated is assigned a NULL value.

14. A method as claimed in claim 10 wherein a tag bit associated with each data location is used to distinguish between a location that contains a child pointer that has yet to be populated and a location that contains a data value or populated child pointer.

15. A method as claimed in claim 10 wherein a child pointer that has yet to be populated is distinguished from a location that contains a data value or populated child pointer by containing a special value that is never used as a data value or populated child pointer.

16. A method as claimed in claim 10 wherein a child pointer that has yet to be populated is assigned a NULL value.

17. A method of building a data structure sent from a first computer to a second computer comprising the steps of:
- receiving, by the second computer, a plurality of messages sent from the first computer to the second computer, each message containing data of a node of the data structure and one or more references to child pointer locations in previously transmitted nodes;
- building the data structure on the second computer, wherein building the data structure includes:
  - storing the data of each transmitted node in a memory of the second computer; and
  - storing the location at which each node is stored in the memory of the second computer in a table of addresses wherein the or each reference to a child pointer location comprises an index into the table of addresses;

and
- processing, by an application running on the second computer, the data structure during the building of the data structure on the second computer.

* * * * *